United States Patent
Manocha et al.

(10) Patent No.: US 12,130,750 B2
(45) Date of Patent: Oct. 29, 2024

(54) HARDWARE SUPPORT FOR OPTIMIZING HUGE MEMORY PAGE SELECTION

(71) Applicant: NVIDIA Corporation, Santa Clara, CA (US)

(72) Inventors: Aninda Manocha, Bethesda, MD (US); Zi Yan, Belmont, MA (US); David Nellans, Round Rock, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 18/118,020

(22) Filed: Mar. 6, 2023

(65) Prior Publication Data
US 2024/0303201 A1    Sep. 12, 2024

(51) Int. Cl.
*G06F 12/1027*    (2016.01)

(52) U.S. Cl.
CPC ................ *G06F 12/1027* (2013.01)

(58) Field of Classification Search
CPC .................................................. G06F 12/1027
See application file for complete search history.

(56) References Cited

U.S. PATENT DOCUMENTS

| | | | | |
|---|---|---|---|---|
| 10,664,199 B2* | 5/2020 | Dulloor | | G06F 3/0673 |
| 2006/0288187 A1* | 12/2006 | Burugula | | G06F 12/126 |
| | | | | 711/171 |
| 2006/0294334 A1* | 12/2006 | Jann | | G06F 12/1027 |
| | | | | 711/170 |
| 2012/0005454 A1* | 1/2012 | Waugh | | G06F 12/1027 |
| | | | | 711/E12.001 |
| 2012/0117301 A1* | 5/2012 | Wingard | | G06F 12/1027 |
| | | | | 711/6 |
| 2012/0284483 A1* | 11/2012 | Foster | | G06F 12/023 |
| | | | | 711/171 |
| 2017/0371805 A1* | 12/2017 | Jayasena | | G06F 12/1009 |
| 2019/0188154 A1* | 6/2019 | Basu Roy Chowdhury | | |
| | | | | G06F 12/1027 |
| 2020/0026657 A1* | 1/2020 | Franke | | G06F 12/1036 |
| 2021/0406194 A1* | 12/2021 | Bryant | | G06F 12/1009 |

OTHER PUBLICATIONS

Lee, "A Banked-promotion TLB for High Performance and Low Power", 2001, IEEE International Conference on Computer Design (Year: 2001).*

(Continued)

*Primary Examiner* — Nanci N Wong
(74) *Attorney, Agent, or Firm* — Zilka-Kotab, P.C.

(57) ABSTRACT

Computer systems often employ virtual address translation hierarchies in which virtual memory addresses are mapped to physical memory. Use of the virtual address translation hierarchy speeds up the virtual address translation when the required mapping is stored in one of the higher levels of the hierarchy. To reduce a number of misses occurring in the virtual address translation hierarchy, huge memory pages may be selectively employed, which map larger continuous regions of virtual memory to continuous regions of physical memory, thereby increasing the coverage of each entry in the virtual address translation hierarchy. The present disclosure provides hardware support for optimizing this huge memory page selection.

32 Claims, 9 Drawing Sheets

(56) References Cited

OTHER PUBLICATIONS

Panwar et al., "HawkEye: Efficient Fine-grained OS Support for Huge Pages," Proceedings of the Twenty-Fourth International Conference on Architectural Support for Programming Languages and Operating Systems (ASPLOS '19), ACM, Apr. 2019, 14 pages.
Kwon et al., "Coordinated and Efficient Huge Page Management with Ingens," Proceedings of the 12th USENIX Symposium on Operating Systems Design and Implementation (OSDI '16), Nov. 2016, pp. 705-721.
Michailidis et al., "MEGA: Overcoming Traditional Problems with OS Huge Page Management," SYSTOR '19, 2019, pp. 121-131.

* cited by examiner

400

| 2MB VPN | Frequency |
|---|---|
| 0x89003425 | 250 |
| ... | ... |
| 0x99003425 | 2 | x bits — f bits

N entries

*Fig. 4*

HARDWARE SUPPORT FOR OPTIMIZING HUGE MEMORY PAGE SELECTION

TECHNICAL FIELD

The present disclosure relates to computer memory management.

BACKGROUND

It is common for computer systems to employ virtual address translation hierarchies to resolve how virtual memory addresses are mapped to physical memory. In particular, when a memory request (e.g. issued by an application) uses a virtual memory address to indicate the portion of memory desired to be accessed, the virtual address translation hierarchy will be searched, in order, until the mapping of the virtual memory address to a physical memory address is found. Typically, this hierarchy will include, from top to bottom, at least one translation lookaside buffer (TLB) that each store some subset of the virtual to physical memory mappings, and then finally a page table that stores the virtual to physical memory mappings for all memory capable of being accessed by computer processes.

While use of virtual address translation caching will speed up the virtual address translation when the required mapping is stored in one of the higher levels of the hierarchy, each miss occurring in the translation hierarchy (i.e. where the mapping is not found in any particular level of the hierarchy) will add to the address translation overhead which in turn will limit overall workload throughput. This overhead problem is further exacerbated when applications exhibit irregular memory access patterns, since the mappings generally needed for the application cannot be anticipated for storage in the higher levels of the hierarchy.

To alleviate this overhead, many computer systems support the concept of huge memory pages which map larger continuous regions of virtual memory to continuous regions of physical memory, thereby increasing the coverage of each entry in the translation hierarchy. However, while employing huge memory pages can reduce the miss rate in the virtual address translation hierarchy, other issues arise. For example, the use of huge memory pages can result in application performance degradation, namely because huge memory pages require additional time to prepare and map into an application's memory space and because huge memory pages will bloat an application's totally memory footprint wasting precious free memory. Furthermore, the availability of large continuous regions of physical memory needed to support huge memory pages is limited and may not satisfy the demand from applications in the computer system.

Considering the drawbacks of using huge memory pages, one solution has been to selectively employ only the huge memory pages that provide the most utility. To date, this selection has been made based on page usage metrics tracked by the operating system. However, monitoring page usage (including recording, aggregating, and resetting data about all pages present in the system) incurs significant overhead itself, which degrades both operating system and application performance. Additionally, this tracking requires significant storage overhead, but reducing the number of bits used to store the metrics does not allow for the desirable high resolution on page activity.

There is a need for addressing these issues and/or other issues associated with the prior art. For example, there is a need to provide hardware support for optimizing huge memory page selection.

SUMMARY

In embodiments, a method and/or system are disclosed to provide hardware support for tracking TLB misses in a virtual address translation hierarchy. A translation lookaside buffer (TLB) miss for a memory access request to a particular base memory page is detected. An indication of the TLB miss is stored in hardware for a huge memory page region that includes the particular base memory page and at least one additional base memory page, where the hardware tracks misses occurring in one or more TLBs of a virtual address translation hierarchy for a plurality of huge memory page regions. In an embodiment, each of the huge memory page regions is a candidate for promotion to a huge memory page.

In embodiments, a method and/or non-transitory computer readable medium are disclosed for huge memory page promotion. Data is accessed indicting misses occurring in one or more TLBs of a virtual address translation hierarchy for a plurality of huge memory page regions, where the misses for the corresponding huge memory regions are tracked in hardware, and where each of the huge memory page regions is a candidate for promotion to a huge memory page. Base memory pages of a select one of the huge memory page regions are promoted to a huge memory page, based on the misses tracked in the hardware.

BRIEF DESCRIPTION OF THE DRAWINGS

FIG. 4 illustrates an exemplary implementation of a hardware cache used for optimizing huge memory page selection, in accordance with an embodiment.

DETAILED DESCRIPTION

In a virtual address translation hierarchy, each level of the hierarchy stores at least a subset of virtual to physical memory mappings. With respect to the embodiments of the present description, the translation hierarchy will include at least one TLB having entries for a subset of a global page table consisting of base memory pages that map some continuous region of virtual memory to some continuous region of physical memory. Embodiments of the present description will detect when a memory access request to a particular base memory page results in a TLB miss (i.e. when the particular base memory page, to which the memory access request is made, is not present in the TLB).

Embodiments of the present description will track detected TLB misses in hardware, for a plurality of huge memory page regions. In the context of the present description, each huge memory page region includes the continuous memory regions covered by two or more base memory pages. Thus, a huge memory page region will be larger than a base memory page region. The hardware may track the TLB misses in any one of a plurality of different ways, as disclosed herein.

In an embodiment, the TLB misses will be tracked in hardware, as mentioned above, for use in optimizing huge memory page selection. In the present description, huge memory page selection refers to selecting which of the huge memory page regions (comprised of two or more base memory pages) are to be promoted to a huge memory page in the page table. The huge memory page selection may be performed in accordance with one or more defined policies, as disclosed in the embodiments below.

By providing hardware support for optimizing huge memory page selection, and in particular by tracking the TLB misses is hardware, any overhead associated with tracking this information in the operating system may be eliminated. Eliminating this overhead will in turn help avoid degradation of operating system and application performance.

Figure 1:
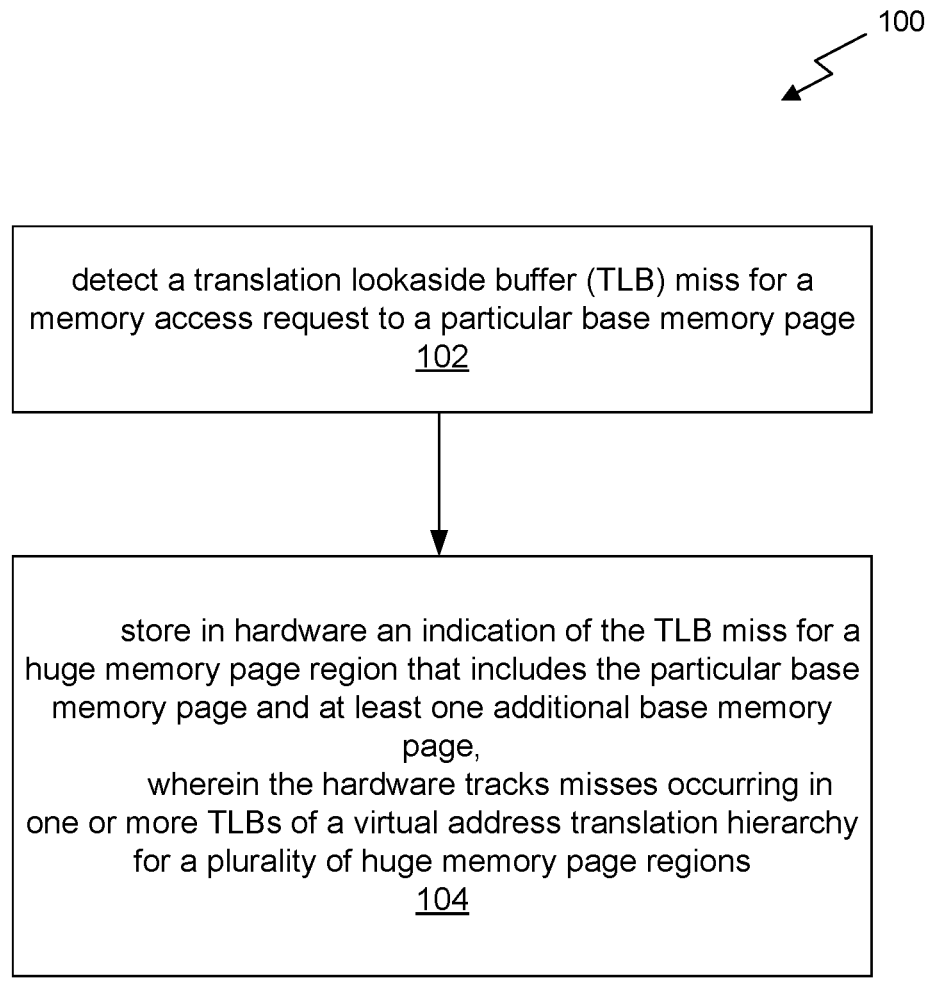
FIG. 1 illustrates a method to provide hardware support for tracking TLB misses in a virtual address translation hierarchy, in accordance with an embodiment.

FIG. 1 illustrates a method 100 to provide hardware support for tracking TLB misses in a virtual address translation hierarchy, in accordance with an embodiment. The method 100 may be performed by a device, which may be comprised of a processing unit, a program, custom circuitry, or a combination thereof, in an embodiment. In another embodiment, a system comprised of a non-transitory memory storage comprising instructions, and one or more processors in communication with the memory, may execute the instructions to perform the method 100. In another embodiment, a non-transitory computer-readable media may store computer instructions which when executed by one or more processors of a device cause the device to perform the method 100. In one embodiment, the method 100 may be performed by the system 900 of FIG. 9.

In operation 102, a translation lookaside buffer (TLB) miss for a memory access request to a particular base memory page is detected. The memory access request refers to a request to access a specified memory location. The memory access request may be a request to read data from the specified memory location or write data to the specified memory location, in exemplary embodiments.

In an embodiment, the memory access request may indicate a virtual memory address. The virtual memory address may be mapped to a physical memory address at which data is to be accessed. In an embodiment, the memory access request may originate from an application's use of data and may correspond to the virtual memory address that maps to the physical memory address at which data is to be accessed. In an embodiment, the memory access request (e.g. that originates from an application) may be issued to a virtual address translation hierarchy by a processing core. The processing core may be a central processing unit (CPU), a graphics processing unit (GPU), or a hardware accelerator, for example.

With respect to the present description, the virtual address translation hierarchy includes at least one TLB, as well as a page table. In embodiments, the virtual address translation hierarchy may include a L1 (level 1) TLB, L1 and L2 (level 2) TLB, etc. Each TLB includes entries for a different subset of base memory pages (described below), whereas the page table may include entries for all base memory pages. Of course, two or more of the TLBs may include entries for a same, or partially same, subset of base memory pages.

As noted above, the memory access request is made for a particular base memory page that includes the mapping of the virtual memory address and the physical memory address. With respect to the present description, a base memory page includes a mapping of a continuous region of virtual memory to a continuous region of physical memory. The base memory page is of a defined size. Just by way of example, the base memory page may be 4 kilobytes (KB) in size.

As also noted above, the TLB miss is detected for the memory access request to the particular base memory page. The TLB miss refers to an event that occurs when the particular base memory page, to which the memory access request is made, is not present in the TLB (i.e. of the virtual address translation hierarchy). In other words, where the memory access request corresponds to a virtual memory address, the TLB miss may occur in a TLB where a mapping of the virtual memory address to a physical memory address is missing.

In an embodiment, the TLB miss may be detected in response to the TLB miss occurring during an L1 (level 1) TLB access. In another embodiment, the TLB miss may be detected in response to the TLB miss occurring during an L2 (level 2) TLB access. In yet another embodiment, the TLB miss may result in the occurrence of a page table walk for the memory access request, and the TLB miss may be detected in response to the page table walk being performed.

In operation 104, an indication of the TLB miss is stored in hardware for a huge memory page region that includes the particular base memory page and at least one additional base memory page. With respect to the present embodiment, the hardware tracks misses occurring in one or more TLBs of the virtual address translation hierarchy for a plurality of huge memory page regions. In an embodiment, each of the huge memory page regions is a candidate for promotion to a huge memory page. It should be noted, however, that the misses may be tracked in the hardware for any other desired purpose, such as for managing a configuration of the virtual address translation hierarchy in any other defined manner. In an embodiment, the hardware may track the misses occurring in the one or more TLBs in parallel with a page table walk occurring as a result of one of the misses.

The hardware refers to any computer hardware (i.e. physical computer components) configured to track TLB misses, per huge memory page region. In an embodiment, the hardware may be a cache. In an embodiment, the hardware may be implemented for only a single processing core that accesses the virtual address translation hierarchy. In another embodiment, the hardware may be shared among a plurality of processing cores that each access a corresponding virtual address translation hierarchy (i.e. where the hardware tracks the TLB misses across the different virtual address translation hierarchies).

Each of the huge memory page regions referenced in the hardware may cover a memory region that includes a plurality of (i.e. two or more) base memory pages, and accordingly, in an embodiment, that memory region may be a candidate for promotion of the corresponding plurality of base memory pages to a huge memory page. A huge memory page region, and accordingly a huge memory page, is of a defined size that encompasses two or more base memory pages. Just by way of example, the huge memory page region may be 2 megabytes (MB) in size. By storing the indication of the TLB miss in the hardware for the corresponding huge memory region, the TLB miss may be tracked in combination with other TLB misses that have occurred for that same huge memory region. It should be noted that the TLB misses may be tracked, per huge memory page region, in various different ways.

In an embodiment, storing the indication of the TLB miss for the huge memory page region may include accessing an entry, in the hardware, for the huge memory page region. This access may subsequently be used to determine a most recently used one or more huge memory page regions, in one embodiment. In another embodiment, storing the indication of the TLB miss for the huge memory page region may further include incrementing a counter of misses included in the entry for the huge memory page region. In this embodiment, the counter may be used to determine one or more huge memory pages having the most frequent TLB misses, for example. As described in the subsequent figures below, most recently used and/or most frequently missed promotion policies may be defined to determine which of the huge memory page regions is to be promoted to a huge memory page in the page table.

In an embodiment, when the entry for the huge memory page region does not exist in the hardware (i.e. for access thereto), then a new entry may be created in the hardware for the huge memory page region. In an embodiment, when the hardware is full, an existing entry in the hardware for another one of the huge memory page regions may be evicted from the hardware, and the new entry may be created after evicting the existing entry. In an embodiment, the existing entry may be selected for eviction from among all existing entries in the hardware based on a replacement policy, which may include a least recently used policy and/or a least frequently used policy, for example.

As mentioned above, the hardware tracks misses occurring in one or more TLBs of the virtual address translation hierarchy, per huge memory page region, where for example each of the huge memory page regions is a candidate for promotion to a huge memory page in the page table. In an embodiment, the hardware may be (e.g. directly or indirectly) accessible to an operating system for use in promoting base memory pages to huge memory pages. In an embodiment, the operating system may select which of the base memory pages to promote based on a promotion policy that uses information about the misses tracked by the hardware for the plurality of huge memory page regions. Again, various examples of the promotion policies that may be used will be described with respect to the subsequent figures below.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 2:
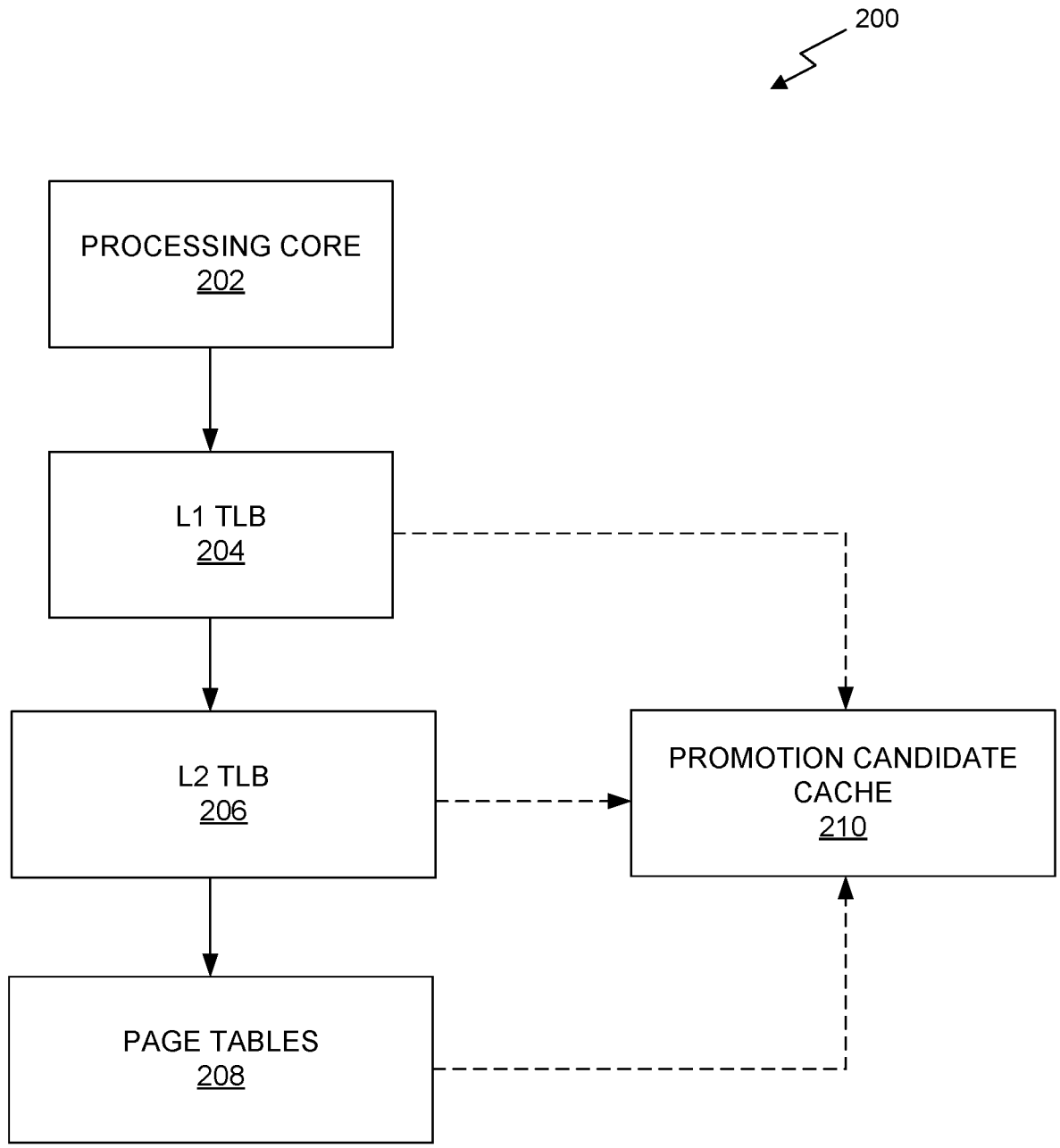
FIG. 2 illustrates a system to provide hardware support for optimizing huge memory page selection, in accordance with an embodiment.

FIG. 2 illustrates a system 200 to provide hardware support for optimizing huge memory page selection, in accordance with an embodiment. It should be noted that the system 200 includes just one possible embodiment of a virtual address translation hierarchy and a corresponding hardware to track TLB misses occurring in the virtual address translation hierarchy. For example, the hardware in the present embodiment is illustrated as locally implemented for the virtual address translation hierarchy of a single processing core. Further, the present system 200 shows the virtual address translation hierarchy as including, from top to bottom, an L1 TLB 204, L2 TLB 206, and one or more page tables 208. Other embodiments are also considered where the virtual address translation hierarchy includes only the L1 TLB 204 in combination with the one or more page tables 208, or where the virtual address translation hierarchy includes more than two TLBs in combination with the one or more page tables 208.

Referring back to the system 200 as a whole, a processing core 202 sends a memory request to the virtual address translation hierarchy. The memory request includes a virtual address, which corresponds to a physical address of data to be accessed. The memory request may originate from an application for accessing data at the physical address, in an embodiment.

An address translation is then performed by the virtual address translation hierarchy to map the virtual address to the physical address. In hierarchical order, the virtual address translation hierarchy checks the TLBs 204, 206 for the mapping. If the mapping is found in one of the TLBs 204, 206, then the physical memory address is returned. If the mapping is missing from (either or both of) the TLBs 204, 206, and in particular if a base page having the mapping is missing from (either or both of) the TLBs 204, 206, then a TLB miss occurs and a walk of the one or more page tables 208 is performed to retrieve it.

When the TLB miss occurs, the TLB miss is detected by a hardware cache, referred to herein as a promotion candidate cache 210. The promotion candidate cache 210 may be configured to be triggered from any one or more levels of the virtual address translation hierarchy. For example, the promotion candidate cache 210 may be configured to detect a TLB miss when the miss occurs in the L1 TLB 204 (i.e. regardless of whether a TLB miss also occurs in the L2 TLB 206 for the memory request), when the miss occurs in the L2 TLB 206, or when a page table walk occurs in the one or more page tables 208.

Responsive to detecting the TLB miss, the promotion candidate cache 210 is accessed to store an indication of the TLB miss for a huge memory page region that includes both the particular base page mapping the virtual memory address to a physical memory address as well as at least one additional base page. The promotion candidate cache 210 may store the indication of the TLB miss in parallel with the page table walk occurring in the one or more page tables 208, in an embodiment.

To this end, the promotion candidate cache 210 detects TLB misses occurring in one or more TLBs 204, 206 of the virtual address translation hierarchy, and further tracks those misses for a plurality of defined huge memory page regions. Using a local promotion candidate cache 210 per processing core may significantly reduce hardware complexity. Each processing core will have its own translation caching hierarchy so the corresponding promotion candidate cache 210 tracks the huge memory page regions that incur the most TLB misses. This design choice also allows the promotion candidate cache 210 to remain fairly small in size, since a single promotion candidate cache 210 only needs to capture the TLB misses for a single processing core and large application memory footprints are typically divided amongst multiple processing cores. The operating system then becomes responsible for aggregating and sorting the promotion candidate information from each processing core before performing promotions.

While not shown, it should be noted that another embodiment is contemplated in which a promotion candidate cache is implemented as global hardware shared among a plurality of processing cores that each access a corresponding virtual address translation hierarchy. A single global promotion candidate cache shared across all cores in systems can track and organize the globally most frequently accessed huge memory page regions. This effectively places the responsibility of aggregating data from multiple cores on the hardware. While this prevents the operating system from needing to perform any aggregation or sorting, this design decision introduces additional hardware complexity.

Figure 3:
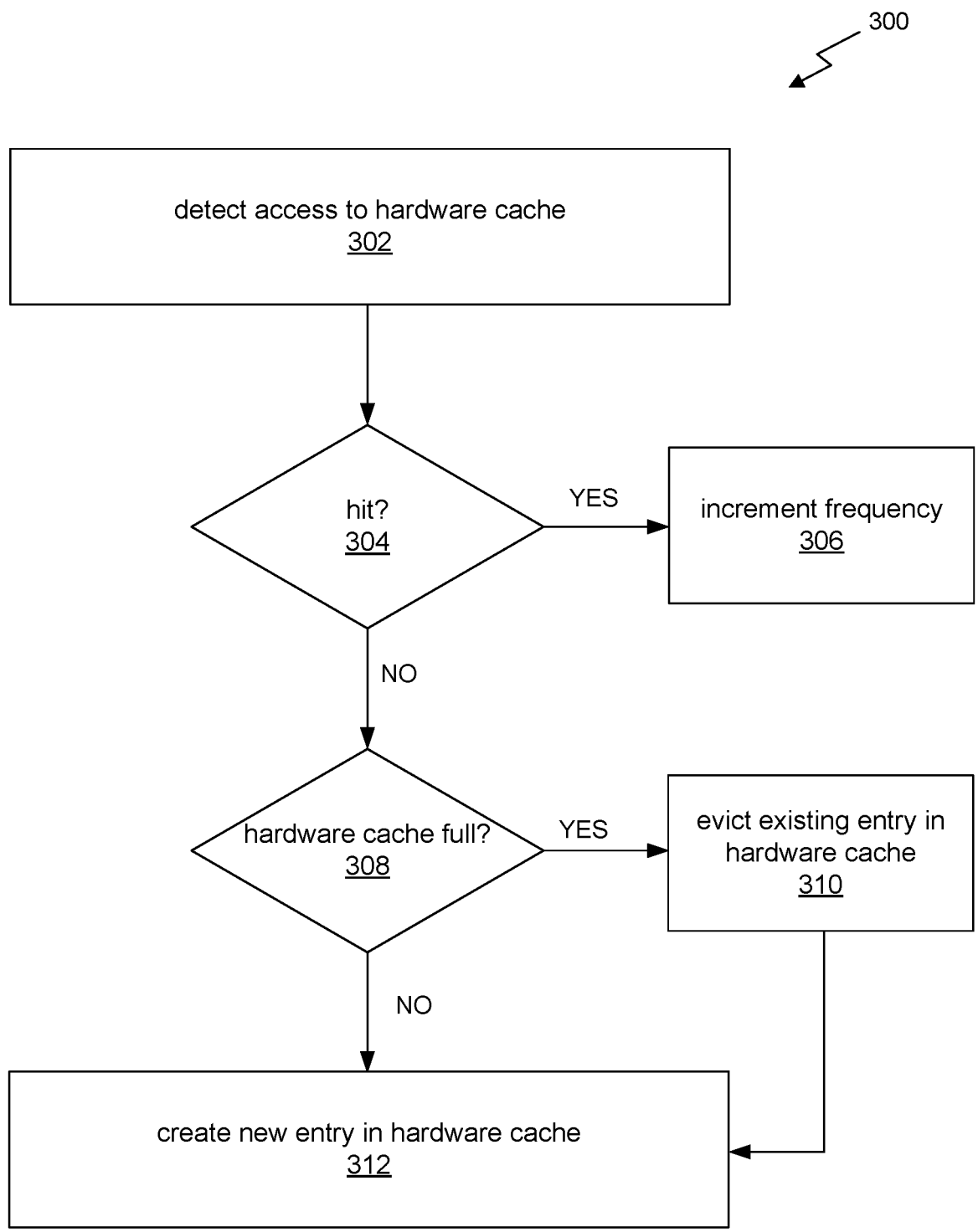
FIG. 3 illustrates a method for managing a hardware cache used for optimizing huge memory page selection, in accordance with an embodiment.
Figure 4:
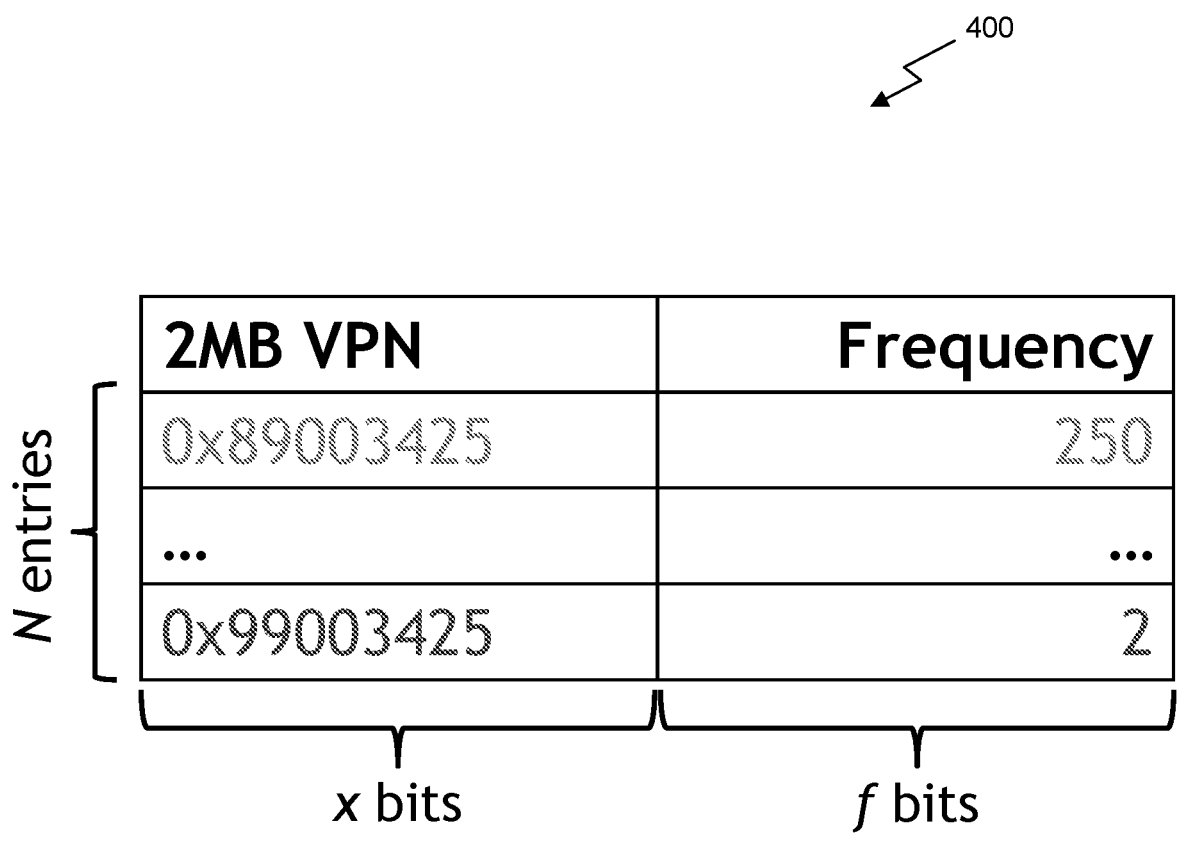
Figure 5:
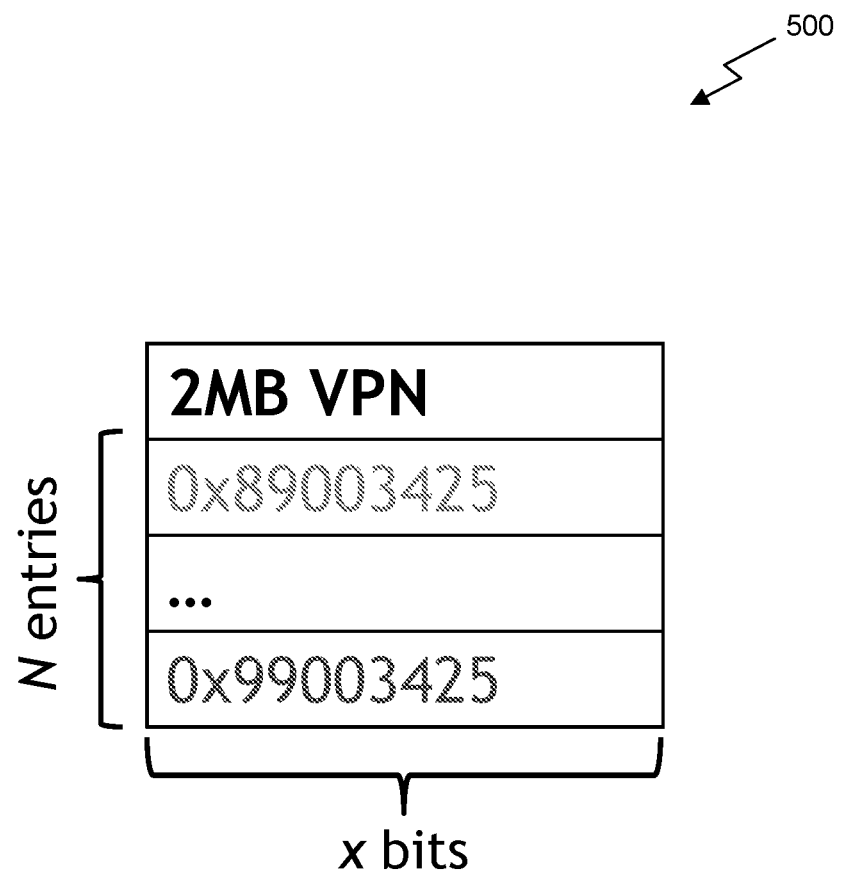
FIG. 5 illustrates an exemplary implementation of a hardware cache used for optimizing huge memory page selection, in accordance with an embodiment.
Figure 7:
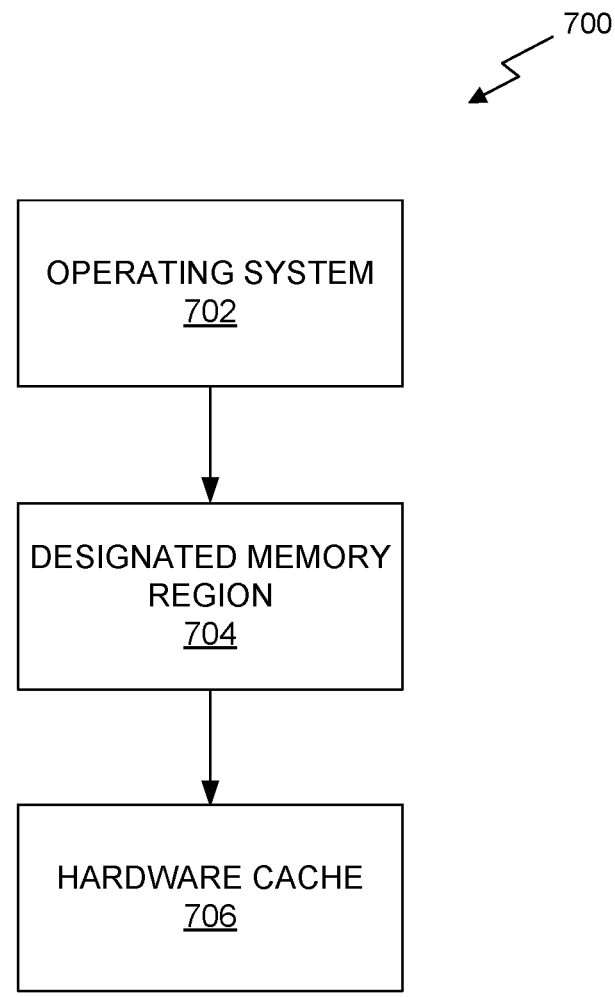
FIG. 7 illustrates a system by which an operating system accesses a designated memory region, written to by a hardware cache, for use in optimizing huge memory page selection, in accordance with an embodiment.
Figure 8:
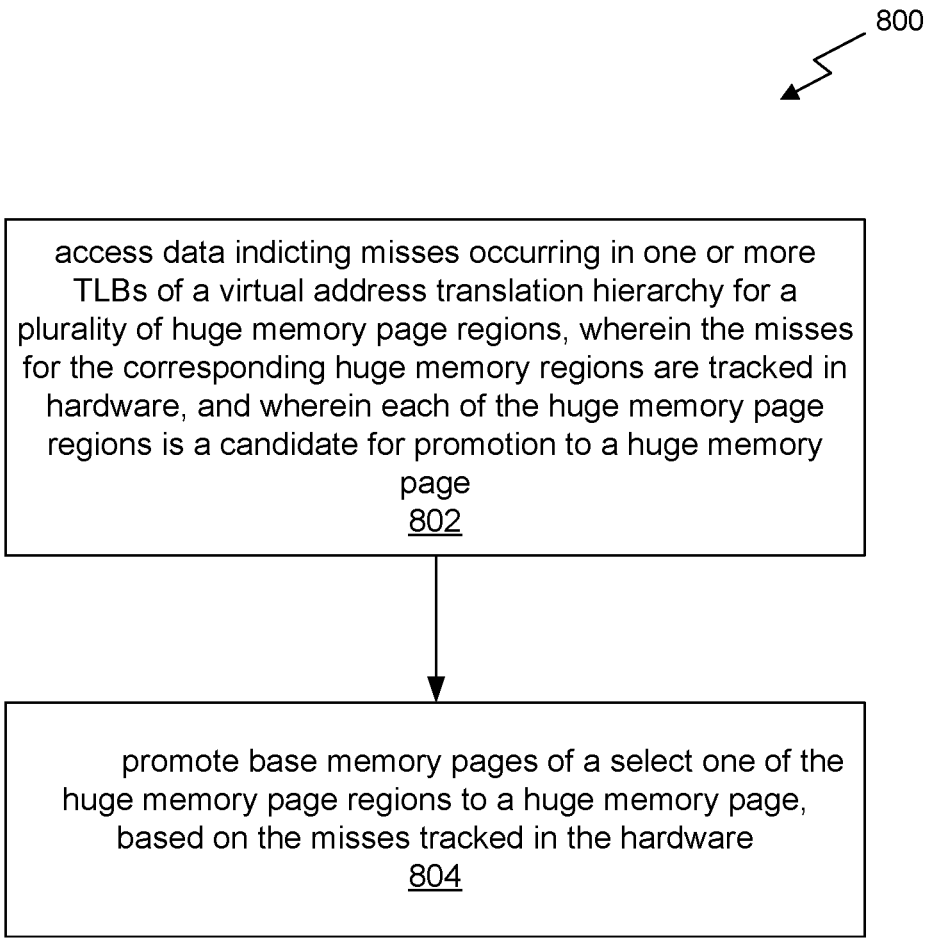
FIG. 8 illustrates a method of an operating system that uses data tracked in hardware for optimizing huge memory page selection, in accordance with an embodiment.

FIG. 3, described below, illustrates one embodiment of how the promotion candidate cache 210 can be managed to track the TLB misses, per a given size of the promotion candidate cache 210. FIGS. 4-5 illustrate different embodiments of a data storage format that may be used by the promotion candidate cache 210 to track the TLB misses. FIG. 7 illustrate different embodiments of systems by which the promotion candidate cache 210 may be used to optimize huge memory page selection for the virtual address translation hierarchy. FIG. 8 illustrates a method by which the promotion candidate cache 210 may be used to optimize huge memory page selection for the virtual address translation hierarchy.

FIG. 3 illustrates a method 300 for managing a hardware cache used for optimizing huge memory page selection, in accordance with an embodiment. With respect to the present embodiment, the hardware cache may be the promotion candidate cache 210 of FIG. 2. The method 300 may be performed by the hardware cache, in an embodiment.

In operation 302, access to the hardware cache is detected. As described above with reference to the prior figures, the hardware cache is accessed when a TLB miss is detected for a virtual address translation hierarchy. In particular, the hardware cache is accessed for the purpose of storing an indication of the TLB miss, with respect to a corresponding huge memory page region, therein.

In decision 304, it is determined whether the access results in a hit. With respect to the present embodiment, the access results in a hit when an entry for the huge memory page region exists in the hardware cache. Again, the huge memory page region includes the base memory page for which the TLB miss occurred and at least one additional base memory page.

As shown, when it is determined in decision 304 that the access results in a hit, then operation 306 is performed to update a frequency to indicate the TLB miss. In other words, in the present embodiment the hardware cache is configured to store entries for respective huge memory page regions, where each entry includes an indicator of a TLB miss frequency for the respective huge memory page region. In an embodiment, the indicator may be a counter that is incremented for each TLB miss that occurs for that huge memory page region, subsequent to an initial TLB miss that occurs for that huge memory page region which will be explained in more detail below.

On the other hand, when it is determined in decision 304 that the access does not result in a hit (i.e. an entry for the huge memory page region does not exist in the hardware cache), then it is determined in decision 308 whether the hardware cache is full. The hardware cache may be configured to store up to a defined maximum number of entries. In this case, the hardware cache may be considered full when it currently stores the maximum number of entries.

Responsive determining in decision 308 that the hardware cache is full, then in operation 310 an existing entry in the hardware cache is evicted. This eviction is performed to free up space in the hardware cache for a new entry corresponding to the huge memory page region for which the TLB miss just occurred (per the hardware cache access detected in operation 302). One or more eviction policies may define the manner for selecting which existing entry is evicted.

The eviction policy or policies may be based on a ranking (i.e. ordering) of the entries in the hardware cache. The entries may be ranked from highest to lowest TLB miss frequency, in an embodiment. In one embodiment, the eviction policy may specify to evict the entry with the lowest TLB miss frequency (i.e. the least frequently used entry).

In another embodiment, the eviction policy may specify to evict the entry that was least recently used (i.e. accessed). In still yet another embodiment, a combination of the least frequently used and least recently used policies may be employed, with the least recently used policy employed as a tiebreaker when multiple entries are selected under the least frequently used policy.

Once an existing entry in the hardware cache is evicted per operation 310, or otherwise responsive determining in decision 308 that the hardware cache is not full, then in operation 312 a new entry is created in the hardware cache for the huge memory page region. The frequency may be initially set in the new entry to zero, in an embodiment.

To this end, the method 300 relates to managing the hardware cache to track specifically a frequency of TLB misses occurring in the virtual address translation hierarchy, per huge memory page region. It should be noted other embodiments are also contemplated for managing the hardware cache to track TLB misses occurring in the virtual address translation hierarchy which do not necessarily involve tracking the TLB miss frequency. For example, the entries in the hardware cache may be stored, or ranked, in order of most recently used entry to least recently used entry, as mentioned above, without necessarily storing the actual TLB miss frequency. Entries may then be evicted, as needed to make space for new entries, per the least recently used policy.

FIG. 4 illustrates an exemplary implementation of a hardware cache 400 used for optimizing huge memory page selection, in accordance with an embodiment. With respect to the present embodiment, the hardware cache may be the promotion candidate cache 210 of FIG. 2.

As shown, the hardware cache 400 of the present embodiment stores N entries that are each x+f number of bits in size. Per entry, the x bits store an indicator of the respective huge memory page region. In the example shown, the x indicator is a tag to a 2 MB virtual page number (VPN).

Per entry, the f bits store an indicator of the TLB miss frequency for the respective huge memory page region. The entries in the hardware cache 400 are sorted by a least frequently used policy, whereby the entries are ordered from greatest TLB miss frequency to smallest TLB miss frequency. This configuration may result in the entries being reordered, as required, each time an entry frequency is updated, and thus may increase logic overhead of the hardware cache 400. Further, storing both the huge memory page region indicator and the frequency indicator may increase storage overhead of the hardware cache 400. However, this configuration may result in lower software overhead when using the hardware cache 400 for huge memory page selection (e.g. the operating system will not necessarily need to generate its own ranking of the huge memory page regions since the TLB miss frequency is already included the data in the hardware cache 400).

FIG. 5 illustrates an exemplary implementation of a hardware cache used for optimizing huge memory page selection, in accordance with an embodiment. With respect to the present embodiment, the hardware cache may be the promotion candidate cache 210 of FIG. 2.

As shown, the hardware cache 500 of the present embodiment stores N entries that are each x number of bits in size. Each entry stores an indicator of the respective huge memory page region. In the example shown, the indicator is a tag to a 2 MB virtual page number (VPN). However, different from the implementation of the hardware cache 400 of FIG. 4, the present hardware cache 500 implementation does not store the indicator of the TLB miss frequency per huge memory page region.

Instead, the entries in the hardware cache 500 are sorted by a least recently used policy, whereby the entries are ordered from most recently accessed entry to least recently access entry. The configuration of the hardware cache 500 in this manner provides for a lower hardware storage overhead by not storing a TLB miss frequency per entry. However, this configuration may result in higher software overhead when using the hardware cache 500 for huge memory page selection (e.g. the operating system will need to generate its own ranking of the huge memory page regions per the data in the hardware cache 500).

Operating System Integration

Operating systems manage memory resources, including huge memory page promotion and demotion, but they lack application page utilization information to make optimal huge memory page promotion/demotion decisions. Prior work has shown that software-only page monitoring introduces significant run time overheads.

The hardware cache design described in the embodiments above is able to minimize these overheads. The hardware cache assists the operating system with promotion decisions, removing the burden of tracking and scanning from the operating system while still providing flexibility about when and what high utility pages to promote to huge memory pages. One embodiment of an operating system integration with the hardware cache may aim to optimize huge memory page utility, that is, promote as few huge memory pages while eliminating as many TLB misses as possible.

Figure 6:
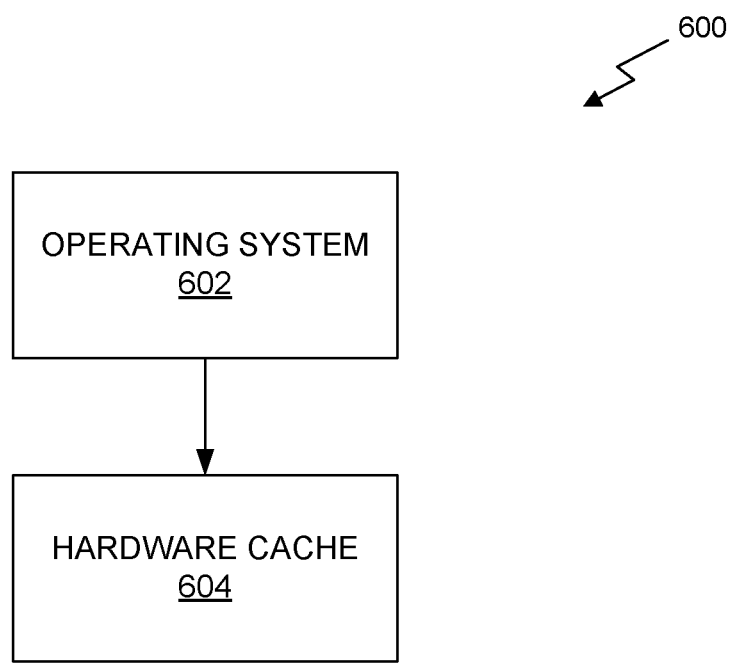
FIG. 6 illustrates a system by which an operating system accesses a hardware cache for use in optimizing huge memory page selection, in accordance with an embodiment.

FIG. 6 illustrates a system 600 by which an operating system accesses a hardware cache for use in optimizing huge memory page selection, in accordance with an embodiment. With respect to the present embodiment, the hardware cache may be the promotion candidate cache 210 of FIG. 2.

In the present embodiment, the operating system 602 has direct access to the hardware cache 604. The operating system 602 periodically queries the hardware cache 604 to read its data. The operating system 602 then selects which huge memory page regions (i.e. candidates) to promote and performs the promotions.

FIG. 7 illustrates a system by which an operating system accesses a designated memory region, written to by a hardware cache, for use in optimizing huge memory page selection, in accordance with an embodiment. With respect to the present embodiment, the hardware cache may be the promotion candidate cache 210 of FIG. 2.

In the present embodiment, the operating system 702 does not have direct access to the hardware cache 706. Instead, the contents of the hardware cache 706 are periodically written into a designated region of physical memory 704. The designated region of physical memory 704 may be accessible to the operating system 702 by a device driver or read directly on demand. The operating system 702 then selects which huge memory page regions (i.e. candidates) to promote and performs the promotions.

FIG. 8 illustrates a method 800 of an operating system that uses data tracked in hardware for optimizing huge memory page selection, in accordance with an embodiment. The method 800 may be performed by a device, which may be comprised of a processing unit, a program, custom circuitry, or a combination thereof, in an embodiment. In another embodiment, a system comprised of a non-transitory memory storage comprising instructions, and one or more processors in communication with the memory, may execute the instructions to perform the method 800. In another embodiment, a non-transitory computer-readable media may store computer instructions which when executed by one or more processors of a device cause the device to perform the method 800. In one embodiment, the method 800 may be performed by the system 900 of FIG. 9.

In particular, the method 800 may be performed by an operating system of any of the mentioned devices, systems, etc. In an embodiment, the method 800 may be performed periodically according to a defined time interval (e.g. every 30 seconds).

In operation 802, data is accessed indicting misses occurring in one or more TLBs of a virtual address translation hierarchy for a plurality of huge memory page regions. As described in the embodiments above, the misses for the corresponding huge memory regions are tracked in hardware, and each of the huge memory page regions is a candidate for promotion to a huge memory page. In one embodiment, the data may be accessed directly from the hardware (e.g. per FIG. 6). In another embodiment, the data may be accessed from a designated region of physical memory which is written to by the hardware (e.g. per FIG. 7).

In operation 804, base memory pages of a select one of the huge memory page regions are promoted to a huge memory page, based on the misses tracked in the hardware. This operation 804 may include selecting just a single one of the huge memory page regions for promotion, selecting a defined number of the huge memory page regions for promotion, or selecting up to a maximum number of the huge memory page regions for promotion.

In an embodiment, the one of the huge memory page regions is selected based on a promotion policy that uses the data. In one embodiment, the promotion policy may be a round robin policy. In another embodiment, the promotion policy may be a highest number of misses policy, in which huge memory page regions with the highest TLB miss frequency values are prioritized. Of course, a combination of one or more promotion policies may be employed. To bias the promotion process, a user can write a value (0=round-robin, 1=highest frequency) to a operating system parameter.

In an embodiment, the promotion policy may allow user input bias to prioritize promotion of defined regions of memory used by one or more select applications. In particular, a user or the operating system may want to prioritize the performance of a specific application or process. In this case, the operating system should also prioritize huge memory pages for the process by promoting data for it until there are no more promotion candidates left (as tracked in the hardware), before trying to promote pages for other processes. The user can write to an operation system parameter the process identifiers to prioritize. The operating system, which knows about process information and associated hardware data, can then adjust its promotion priority list accordingly, e.g. highest TLB miss frequency or round robin amongst the biased processes if there is more than one.

In an embodiment, promoting the base memory pages may cause a TLB shootdown that in turn causes entries in the hardware used for tracking the misses for the huge memory page regions to be flushed. When any TLB shootdown occurs, whether due to promotion or another process such as page migration, the corresponding huge memory page region, if it exists in the hardware, is invalidated and thus automatically flushed from the hardware.

Figure 9:
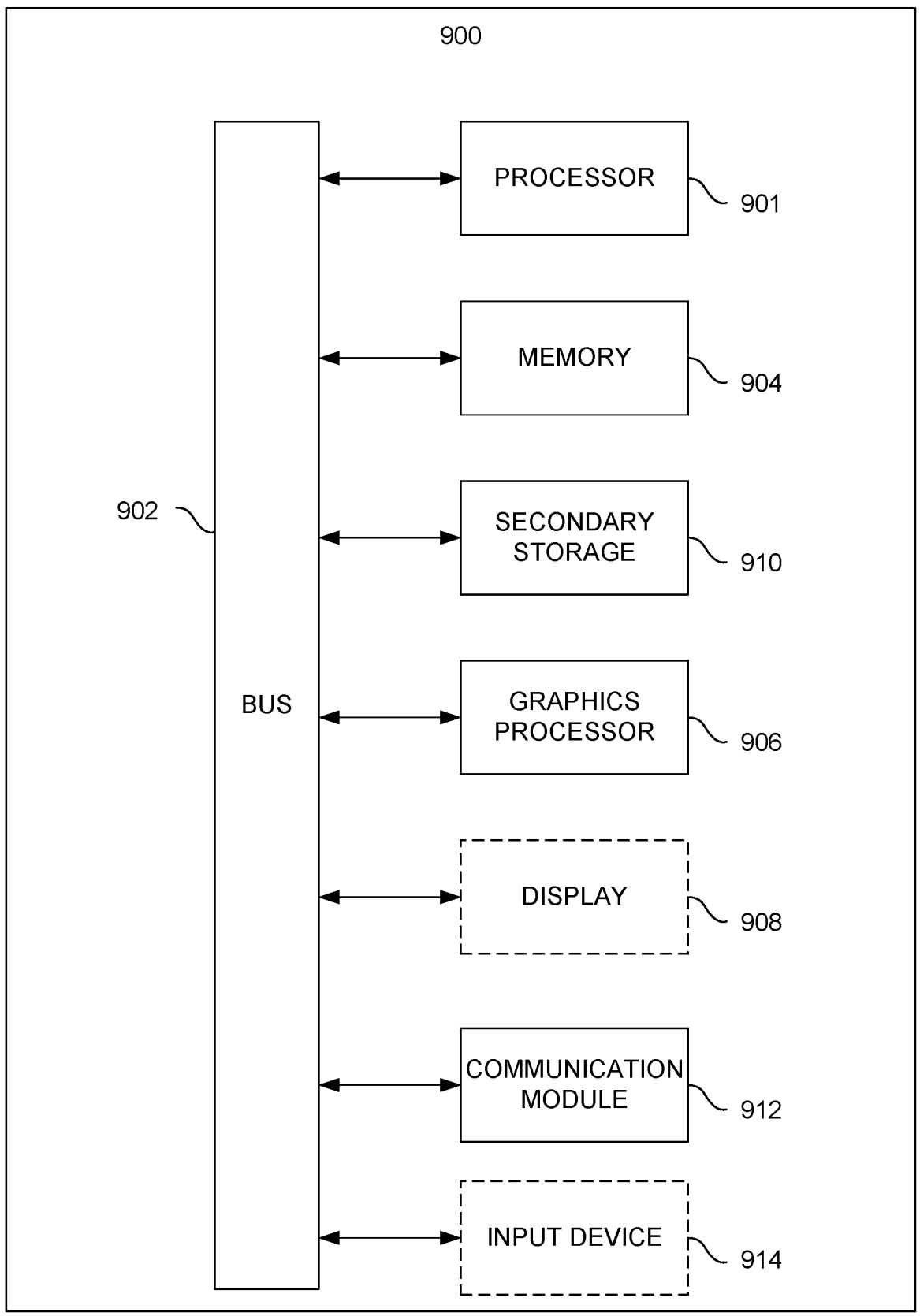
FIG. 9 illustrates an exemplary computing system, in accordance with an embodiment.

FIG. 9 illustrates an exemplary computing system 900, in accordance with an embodiment.

As shown, the system 900 includes at least one central processor 901 which is connected to a communication bus 902. The system 900 also includes main memory 904 [e.g. random access memory (RAM), etc.]. The system 900 also includes a graphics processor 906 and optionally a display 908.

The system 900 may also include a secondary storage 910. The secondary storage 910 includes, for example, a hard disk drive and/or a removable storage drive, representing a flash drive or other flash storage, etc. The removable storage drive reads from and/or writes to a removable storage unit in a well-known manner.

Computer programs, or computer control logic algorithms, may be stored in the main memory 904, the secondary storage 910, and/or any other memory, for that matter. Such computer programs, when executed, enable the system 900 to perform various functions, including for example any of the methods set forth above. The computer programs, when executed, may also enable such methods. Memory 904, storage 910 and/or any other storage are possible examples of non-transitory computer-readable media.

The system 900 may also include one or more communication modules 912. The communication module 912 may be operable to facilitate communication between the system 900 and one or more networks, and/or with one or more devices (e.g. game consoles, personal computers, servers etc.) through a variety of possible standard or proprietary wired or wireless communication protocols (e.g. via Bluetooth, Near Field Communication (NFC), Cellular communication, etc.).

As also shown, the system 900 may include, in one optional embodiment, one or more input devices 914. The input devices 914 may be a wired or wireless input device. In various embodiments, each input device 914 may include a keyboard, touch pad, touch screen, game controller, remote controller, or any other device capable of being used by a user to provide input to the system 900.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method comprising:
   at a device:
      detecting a translation lookaside buffer (TLB) miss for a memory access request to a particular base memory page existing in a page table; and
      storing in hardware an indication of the TLB miss for a memory page region that includes the particular base memory page existing in the page table and at least one additional base memory page existing in the page table, wherein the memory page region is a candidate for inclusion in the page table as a huge memory page region,
      wherein the hardware tracks misses occurring in one or more TLBs of a virtual address translation hierarchy for a plurality of candidate huge memory page regions.

2. The method of claim 1, wherein the memory access request originates from an application's use of data and corresponds to a virtual memory address that maps to a physical memory address at which data is to be accessed.

3. The method of claim 1, wherein the memory access request is issued to the virtual address translation hierarchy by a processing core that is one of:
   a central processing unit (CPU),
   a graphics processing unit (GPU), or
   a hardware accelerator.

4. The method of claim 1, wherein the TLB miss is detected in response to the TLB miss occurring during an L1 TLB access.

5. The method of claim 1, wherein the TLB miss is detected in response to the TLB miss occurring during an L2 TLB access.

6. The method of claim 1, wherein the TLB miss results in the occurrence of a page table walk for the memory access request.

7. The method of claim 1, wherein the memory access request corresponds to a virtual memory address, and wherein the TLB miss occurs in a TLB where a mapping of the virtual memory address to a physical memory address is missing.

8. The method of claim 1, wherein the hardware is a cache.

9. The method of claim 1, wherein each of the candidate huge memory page regions covers a memory region that includes a plurality of base memory pages.

10. The method of claim 9, wherein the memory region is a candidate for promotion of the plurality of base memory pages to a huge memory page in the page table.

11. The method of claim 1, wherein the hardware tracks the misses occurring in the one or more TLBs in parallel with a page table walk occurring as a result of one of the misses.

12. The method of claim 1, wherein storing the indication of the TLB miss for the memory page region includes:
   accessing an entry, in the hardware, for the memory page region.

13. The method of claim 12, wherein storing the indication of the TLB miss for the memory page region further includes:
   incrementing a counter of misses included in the entry for the memory page region.

14. The method of claim 12, wherein when the entry for the memory page region does not exist in the hardware, then a new entry is created in the hardware for the memory page region.

15. The method of claim 14, wherein when the hardware is full, an existing entry in the hardware for another one of the candidate huge memory page regions is evicted from the hardware, and the new entry is created after evicting the existing entry.

16. The method of claim 15, wherein the existing entry is selected for eviction from among all existing entries in the hardware based on a replacement policy.

17. The method of claim 16, wherein the replacement policy includes at least one of:
   a least recently used policy, or
   a least frequently used policy.

18. The method of claim 1, wherein the hardware is implemented for only a single processing core that accesses the virtual address translation hierarchy.

19. The method of claim 1, wherein the hardware is shared among a plurality of processing cores that each access a corresponding virtual address translation hierarchy.

20. The method of claim 1, wherein the hardware is accessible to an operating system for use in promoting base memory pages to huge memory pages.

21. The method of claim 20, wherein the operating system selects which of the base memory pages to promote based on a promotion policy that uses information about the misses tracked by the hardware for the plurality of candidate huge memory page regions.

22. The method of claim 1, wherein each of the candidate huge memory page regions is a candidate for promotion to a huge memory page in the page table.

23. A system, comprising:
   a hardware cache configured to:
   detect a translation lookaside buffer (TLB) miss for a memory access request to a particular base memory page existing in a page table; and
   store an indication of the TLB miss for a memory page region that includes the particular base memory page existing in the page table and at least one additional base memory page existing in the page table, wherein the memory page region is a candidate for inclusion in the page table as a huge memory page region,
   wherein the hardware cache tracks misses occurring in one or more TLBs of a virtual address translation hierarchy for a plurality of candidate huge memory page regions.

24. A non-transitory computer-readable media storing computer instructions which when executed by one or more processors of a device cause the device to:
   access data indicting misses occurring in one or more TLBs of a virtual address translation hierarchy for a plurality of memory page regions, wherein the misses for the corresponding memory page regions are tracked in hardware, and wherein each of the memory page regions includes a plurality of base memory pages existing in a page table and is a candidate for inclusion in the page table as a huge memory page; and
   promote base memory pages of a select one of the memory page regions to a huge memory page in the page table, based on the misses tracked in the hardware.

25. The non-transitory computer-readable media of claim 24, wherein the accessing and the promoting is performed by an operating system.

26. The non-transitory computer-readable media of claim 24, wherein the accessing and the promoting is performed periodically according to a defined time interval.

27. The non-transitory computer-readable media of claim 24, wherein the data is accessed directly from the hardware.

28. The non-transitory computer-readable media of claim 24, wherein the data is accessed from a designated region of physical memory which is written to by the hardware.

29. The non-transitory computer-readable media of claim 24, wherein the one of the memory page regions is selected based on a promotion policy that uses the data.

30. The non-transitory computer-readable media of claim 29, wherein the promotion policy includes at least one of:
   a round robin policy, or
   highest number of misses policy.

31. The non-transitory computer-readable media of claim 29, wherein the promotion policy allows user input bias to prioritize promotion of defined regions of memory used by one or more select applications.

32. The non-transitory computer-readable media of claim 24, wherein promoting the base memory pages causes a TLB shootdown that in turn causes entries in the hardware used for tracking the misses for the memory page regions to be flushed.

* * * * *